H. G. HULBURD.
FRUIT-DRIER.

No. 179,313. Patented June 27, 1876.

Witnesses
Geo. H. Strong
C. M. Richardson

Inventor
Hiland G. Hulburd
By his Atty's
Dewey & Co.

UNITED STATES PATENT OFFICE.

HILAND G. HULBURD, OF PLACERVILLE, CALIFORNIA.

IMPROVEMENT IN FRUIT-DRIERS.

Specification forming part of Letters Patent No. 179,313, dated June 27, 1876; application filed January 21, 1876.

*To all whom it may concern:*

Be it known that I, HILAND G. HULBURD, of Placerville, El Dorado county, State of California, have invented an Improved Fruit-Drying Machine; and I do hereby declare the following description and accompanying drawings are sufficient to enable any person skilled in the art or science to which it most nearly appertains to make and use my said invention or improvement without further invention or experiment.

My invention relates to an improved machine for drying fruit, vegetables, and other substances; and it consists in a central heating apparatus having openings at its top to let the heated air into the drying-chamber, combined with an outer revolving fruit-drying chamber having openings at its bottom, so that the draft through the drying-chamber is downward.

Where fruit is subjected to an upward-moving current of hot air, whether the fruit is carried toward or away from the greatest heat, the air, when it becomes saturated with the moisture from the green fruit, has a tendency to descend, and will arrange itself in strata according to its specific gravity or degree of saturation. The fruit is therefore compelled to pass from one degree of heat and moisture to another during its entire passage through the machine, whereas many kinds of fruit, vegetables, and other substances, require a perfectly uniform dry atmosphere, and should not be subjected to any great quantity of moisture during the drying process. This is illustrated by the capacity of my machine to produce perfect raisins from grapes, which I have accomplished in the most satisfactory manner.

In order to describe my improved fruit-drier reference is had to the accompanying drawings, in which—

Figure 1:
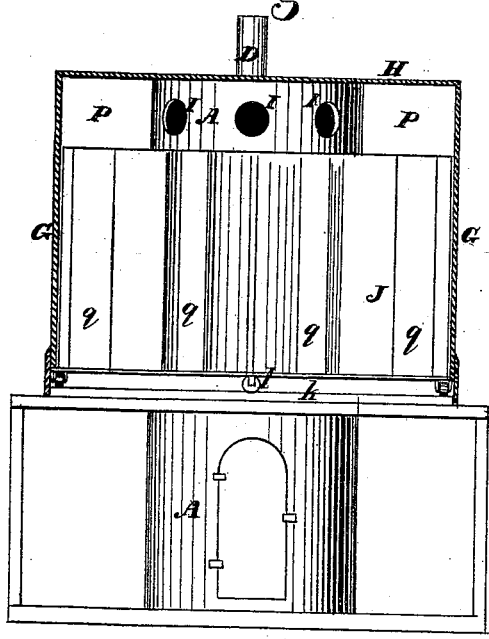
Figure 2:
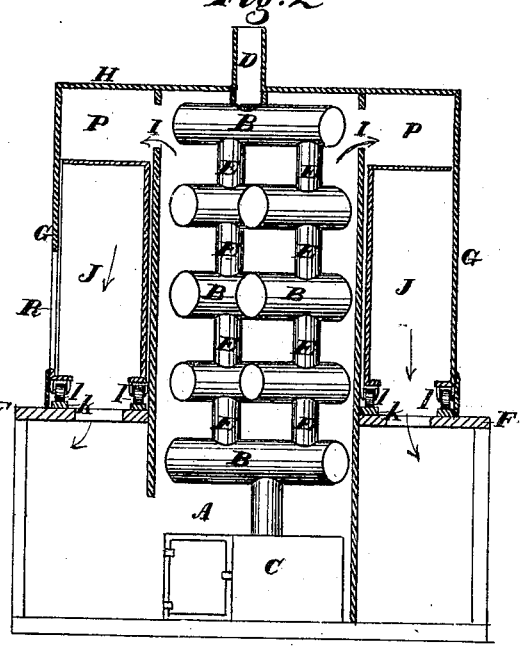
Figure 3:
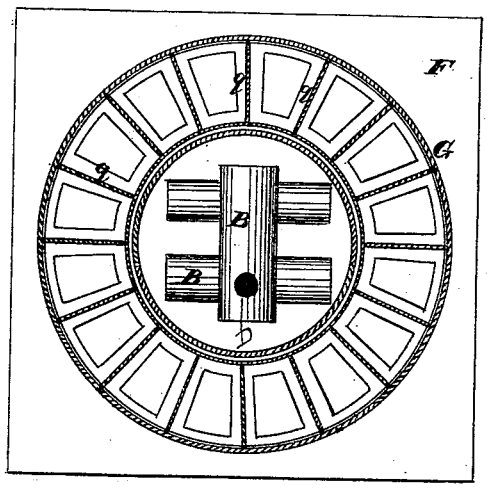
Figure 4:
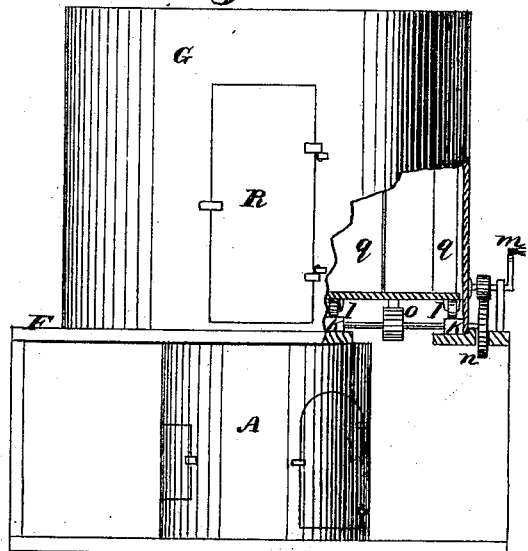

Figure 1 is a side elevation with the outer casing of the drying-chamber cut away. Fig. 2 is a vertical cross-section of drying-chamber and elevation of heating apparatus. Fig. 3 is plan view with the top of the apparatus removed. Fig. 4 is a side elevation with a portion of the casing cut away, and showing the means of rotating the drying-chamber.

Let A represent a furnace or tower, which can be of any desired height, according to the size of the proposed machine. Inside of this furnace or tower I construct a system of heating-drums, B B, one above another, which extend from near the bottom to the top of the tower, being connected together by means of short pipes or tubes E E. Below this system of drums is a fire-box, C, which is connected with the lowest drum, so that the heat and products of combustion from the fire-box will pass successively into and through each of the heating-drums, and, finally, enter the stack or chimney D at the top, through which they pass to the outside atmosphere.

F is a floor, which I construct around the tower A, at the desired height from its base, and upon this floor I construct a circular wall, G, which surrounds the tower at a short distance from its outer wall, so as to provide an annular chamber between them. This annular chamber is covered over by the same roof H which covers the tower, so that it provides a close drying-chamber.

Openings I I I, through the wall of the tower, near its top, connect the space inside of the tower with the surrounding heating-chamber at short intervals, so that the heated air in the tower can pass freely into the upper part of the chamber.

J is an annular carriage, which is built to correspond with the annular drying-chamber, and travel around inside of it. This carriage is mounted upon wheels $l\ l$, which move upon the tracks $k\ k$, and the power to move it is applied by means of a crank, $m$, and gear-wheels $n\ o$, at one side, or by other equivalent mechanism, to which hand or other power can be applied, so that it can be moved continuously or intermittingly, as desired. This carriage extends upward only to the openings I in the wall of the tower, so that a space, P, is left above it in the drying-chamber, and it is formed into numerous compartments by means of vertical partitions $q\ q$, which convert it into a series of small upright chambers, the upper end of each chamber opening into the space above the carriage, while an opening in the bottom of each compartment allows the saturated air to settle downward.

It is evident that, if desirable, the upper end of each compartment can be covered by a slide, which can be adjusted so as to regulate the quantity of heated air to be admitted to each compartment.

The fruit or other substance to be dried I place upon racks or trays, which will slide upon brackets into the small compartments between the partitions, and in this manner I fill each of the compartments.

A door, R, is made in the outer wall G, which is as large as each of the compartments of the carriage, so that when one of the compartments is opposite the door, and the door is opened, the trays containing the fruit or other substance can be placed in position, or removed, as desired. Over this door I arrange a slide, (not shown,) which can be used to cover the top of the compartment which is opposite the door when the door is opened, so that the hot air will be excluded from it while the fruit is being inspected or changed.

In operation the heat and products of combustion, which pass upward from the fire-box through the heating-drums B B, will heat the air inside the tower around them, and the natural draft will cause this heated air to pass through the openings I I in the wall G, and into the space of the drying-chamber, above the carriage; thence it passes downward through the substance or articles in the compartments to be dried, and, as soon as it becomes charged with moisture, it settles by its superior gravity through the openings in the bottom of the compartments into the atmosphere. The fruit is thus subjected to a constant and uniform temperature of dry air, which is heated by radiation, and which will not eliminate the moisture too suddenly or overheat the fruit.

This machine is especially adapted for converting grapes into raisins, as the temperature of the drying-atmosphere can be perfectly regulated, and the process can be continued at a low temperature, which is a necessity in making raisins.

Having thus described my invention, what I claim, and desire to secure by Letters Patent, is—

In a fruit-drying machine, the combination of a central heating apparatus, B B, provided with openings I I at the top, with a surrounding revolving drying-chamber, J, provided with the opening $k$ at its bottom to produce a downward draft through said drying-chamber, substantially as set forth.

HILAND G. HULBURD.

Witnesses:
GEO. H. STRONG,
C. M. RICHARDSON.